May 13, 1952     O. M. CARLSON     2,596,811
EASEL FOR PHOTOGRAPHIC ENLARGERS

Filed Jan. 7, 1949     2 SHEETS—SHEET 1

INVENTOR.
Orlyn M. Carlson
BY
Richard C. Lindberg
ATTORNEY

May 13, 1952     O. M. CARLSON     2,596,811
EASEL FOR PHOTOGRAPHIC ENLARGERS
Filed Jan. 7, 1949     2 SHEETS—SHEET 2
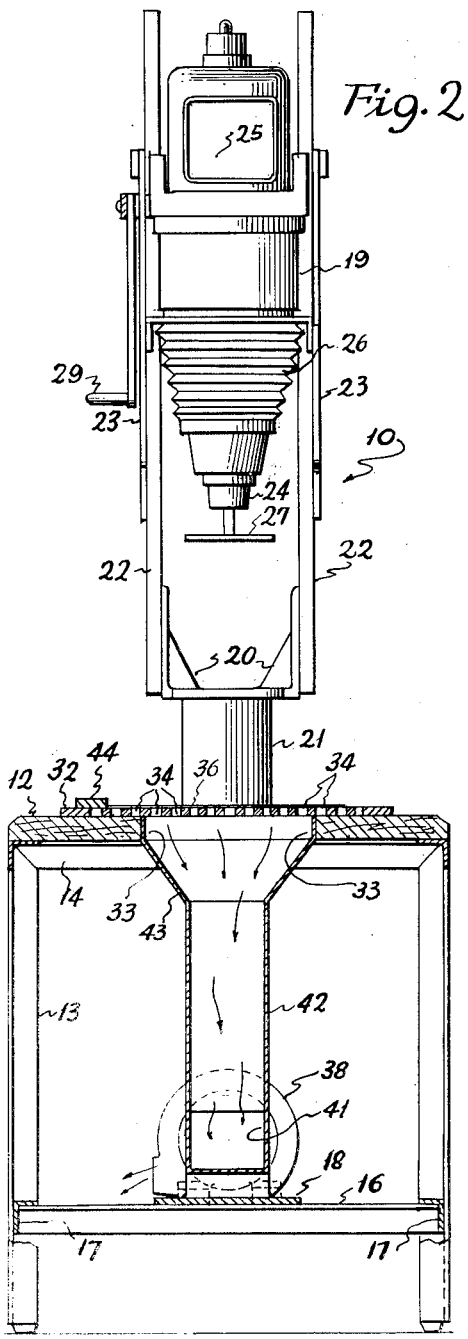
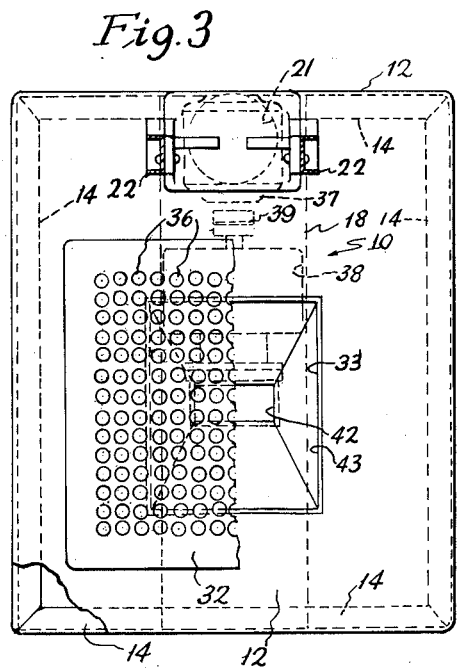
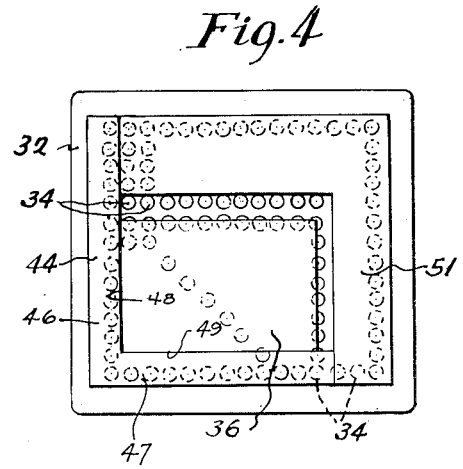
INVENTOR.
Orlyn M. Carlson
BY
Richard C. Lindberg
ATTORNEY Patented May 13, 1952

2,596,811

UNITED STATES PATENT OFFICE 2,596,811

EASEL FOR PHOTOGRAPHIC ENLARGERS

Orlyn M. Carlson, Chicago, Ill.

Application January 7, 1949, Serial No. 69,665

1 Claim. (Cl. 88—24)

This invention relates in general to photographic enlargers and relates particularly to improvements in easels for holding sensitized photographic papers.

Since the advent of fine grain emulsions for film negatives, photographs produced in mass quantities for student groups, professional and athletic groups have been taken on so-called miniature film, enlarged prints being made therefrom by means of a photographic enlarger. The extremely fine grain film negative used with the enlarger gives an enlarged print having acceptable qualities as regards grain and which may have even better grain characteristics than contact prints made from large size negatives not possessing fine grain characteristics. It is obvious, of course, that the use of such miniature film effects a saving in cost, at the same time not detracting from the quality of the positive prints made therefrom by enlargement.

The use of conventional enlarging equipment poses a problem as regards the speedy production of enlarged prints. Heretofore such enlargers have been provided with easels for holding the sensitized paper in position for projecting the image thereon. Such easels have generally consisted of a masking frame hinged to the easel which was required to be swiveled about its hinge prior to inserting the sensitized paper in position and then swiveled back about its hinge for holding the paper along its edges during exposure. Because of the operation sequence required in using such masking frames in connection with the positioning of the sensitive paper and in connection with the removing of the exposed paper, the output per hour of exposed and enlarged prints has been rather limited.

In the quantity production of enlarged prints for the uses recited above it is desirable to have the sensitized paper exposed to its edges which results in a saving of paper and also results in a desirable effect referred to in the graphic arts as "bleed." Heretofore it has not been possible to expose the sensitized paper out to its edges because it was necessary to hold the paper along the edges by the masking frame, and hence to achieve "bleed" it was necessary to trim the unexposed edges, thereby resulting in a waste of paper.

With the foregoing considerations in mind it is a principal object of this invention to shorten the time cycle required in enlarging photographic prints.

A further object is to enable the sensitized enlarging paper to be positioned for exposure with the entire surface including the corners and edges held in the same plane thus eliminating any possibility of distortion of the print, and without the use of making frames or other means overlying the sensitized paper for holding the paper in place.

Another object is to hold the sensitized paper in position for exposure over the entire surface thereof to provide "bleed," thereby making it unnecessary thereafter to trim the print.

Still another object comprehends the positioning and holding of a sensitized enlarging paper by a source of vacuum pressure applied to a foraminous easel against which the sensitized paper is held.

Other objects of the invention from the description following taken together with the drawings which show preferred embodiment and what is now considered to be the best mode of applying the principle of the invention, the scope of the invention, however, not being limited in terms of the embodiment shown, but only by the terms of the claim appended.

In the drawings:

Fig. 2 is a front view thereof, certain parts thereof being shown in section;

Fig. 3 is a top view thereof, certain parts being broken away to show details thereof; and Fig. 4 is a detail plan view showing a guide for positioning the photosensitive paper on the easel and also showing a mask for increasing the vacuum pressure on the photosensitive paper.

Figure 1:
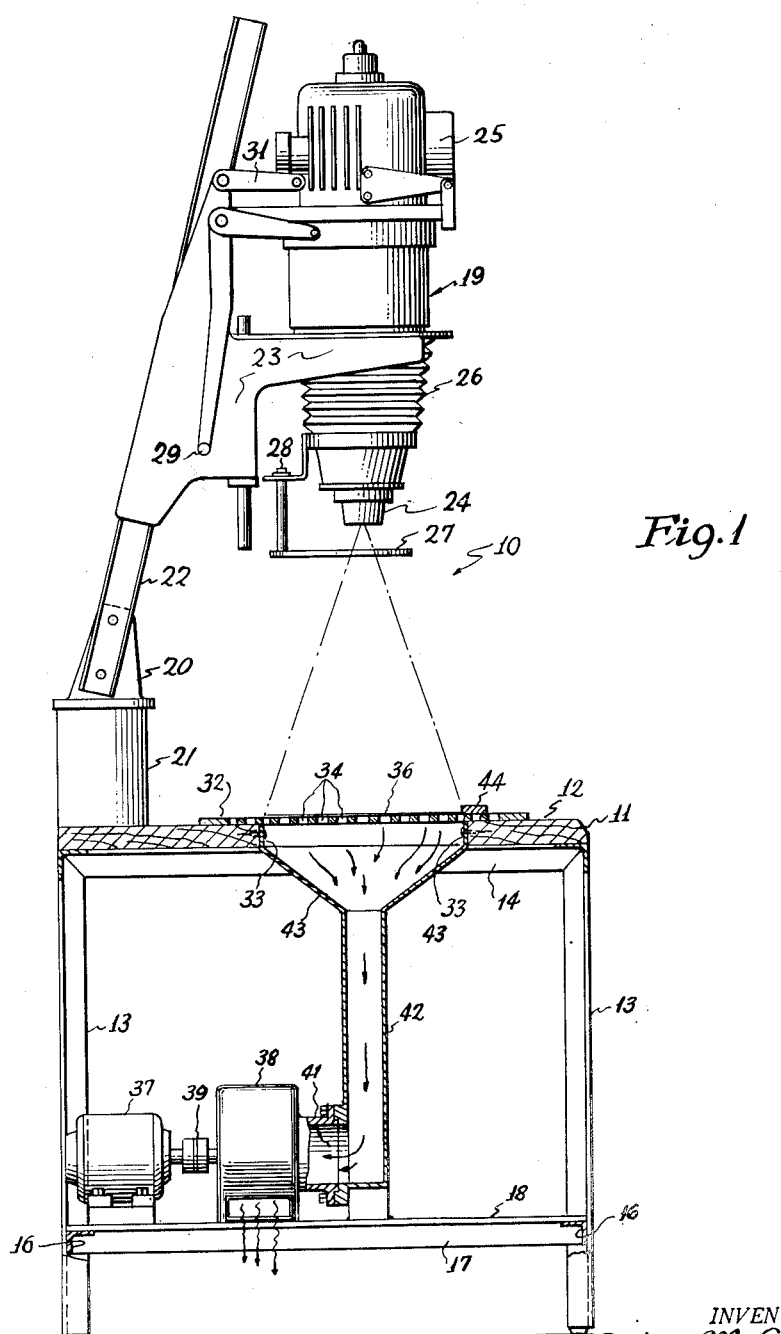
Fig. 1 is a side view of a photographic enlarger embodying the easel according to the present invention, certain parts thereof being shown in section.

Referring now to the drawings, the photographic enlarger and easel according to the present invention is indicated at 10 and comprises a bench 11 including a working surface 12 and supporting means for the bench including vertical legs 13 formed from angle members joined by welding along their top ends by horizontal angle members 14 which provide a rectangular shaped frame as seen in Fig. 3 for the working surface 12, which may be secured to the angle members 14 in any convenient manner. The vertical legs 13 are additionally braced by angles 16 and 17 welded thereto. The angles 16 support a platform 18 spanning the angles 16 for a purpose as will appear.

The bench 11 has mounted thereon a photographic enlarger 19 mounted on a base 21 and secured to the bench 11 in any convenient manner. The enlarger 19 depends from spaced inclined rails 22, which are pivotally connected to the base 21 by a swivel member 20, by a bracket 23 adapted to move the enlarger 19 up and down along the rails 22 as desired. The enlarger 19 includes a lamp housing 25, a lens mounting 24, a bellows 26 and a red filter 27 pivoted to the lens mounting 24 at 28. The enlarger 19 also includes adjusting members 29 and 31 for adjusting the position of the enlarger 19 along the spaced rails 22. The details of construction of the enlarger 19 are no part of the invention except that the enlarger 19 is capable of orientation by means of the rails 22 and the swivel member 20 with respect to the bench 11.

An easel formed of a plate-like rectangular shaped member 32 is adapted to overlie the working surface 12 and underlie the enlarger 19, and to span a rectangular opening 33 in the surface 12. As shown with particular reference to Figs. 1 and 2, the easel 32 is provided with spaced perforations 34 which lie over the opening 33. For the sake of clarity the easel 32 is referred to in the claim as a foraminous plate-like member.

Means are provided for subjecting one side of the easel 32 to vacuum pressure for holding a photosensitive paper 36 to the easel 32 for exposure to an image projected by the enlarger 19. To this end there is provided a motor 37 mounted on the platform 18 connected to a vacuum pump or suction fan 38 by means of a flexible coupling 39. The inlet side 41 of the fan 38 is connected to a duct 42 which flares at 43 to meet the opening 33 formed in the working surface 12. It will be seen that when vacuum pressure is applied by the suction fan 38 to the underside of the easel 32, that the photosensitive paper will be held to the easel 32 and will be held during exposure to the image projected by the enlarger 19.

Means are provided for positioning the photosensitive paper 36 overlying the easel 32 during exposure. As shown with particular reference to Fig. 4, the easel 32 has lying thereon a guide 44 which is L-shaped in form and having legs 46 and 47 which contiguous edges 48 and 49 of the photosensitive paper 36 are adapted to abut. The guide 44 is freely orientable over the upper surface of the easel 32 according to the location of the image projected by the enlarger and so that the legs 46 and 47 will abut the edges 48 and 49 of the paper 36 while the paper is held by the vacuum pressure developed by the vacuum pump 38.

In order to increase the vacuum pressure against the sensitive paper 36 for holding it firmly during exposure, portions of the easel 32 not covered by the sensitive paper 36 may be covered by a mask 51 which is preferably L-shaped as is the guide 44, and so oriented with respect to the easel 32 as to leave an area on the easel 32 for placing of the sensitive paper 36 thereon.

The invention thus described affords rapid production of enlarged prints which are firmly held in the exposure process without the need of masking frames or clips or other holding devices which require a great deal of manipulation in their use. The easel according to the present invention also enables the prints to be exposed to their edges thus making for more efficient use of the photosensitive paper. While the invention has been described in terms of a preferred embodiment thereof its scope is not to be limited in terms of the embodiment herein nor otherwise than by the terms of the claim here appended.

I claim:

In a combination photographic enlarger and easel bench, a work surface lying in a horizontal plane, supporting frame members for said work surface, said frame members and said work surface providing a base for said photographic enlarger whereby said photographic enlarger may be positioned in overlying relationship with respect to said work surface and oriented with respect thereto, a platform spaced from and below said work surface and supported on said supporting frame members, a vacuum pump and a driving motor therefor supported on said platform, a vacuum duct connecting said vacuum pump to an opening in said work surface, a foraminous plate resting upon said work surface and overlying said opening to provide a plurality of vacuum openings for holding a photo-sensitive paper to said foraminous plate and beneath said photographic enlarger for exposure thereof, a freely orientable guide overlying said foraminous plate for guiding said photo-sensitive paper and for closing a portion of the openings in said foraminous plate to increase the vacuum pressure on said photo-sensitive paper, said freely orientable guide consisting of a pair of L-shaped members capable of movement relative to each other to define a rectangular frame over said foraminous plate, one of said L-shaped members having legs in abutting relationship with a pair of contiguous edges of said photo-sensitive paper, the other of said L-shaped members being disposed in non-overlapping relationship with respect to the photo-sensitive surface of said photo-sensitive paper, whereby the image being projected on said photo-sensitive paper may extend to the edges thereof.

ORLYN M. CARLSON.

REFERENCES CITED

The following references are of record in the file of this patent:

UNITED STATES PATENTS

| Number | Name | Date |
| --- | --- | --- |
| 661,840 | Baker | Nov. 13, 1900 |
| 1,347,824 | Pifer | July 27, 1920 |
| 1,813,689 | Weisker | July 7, 1931 |
| 1,851,028 | Worrall | Mar. 22, 1932 |
| 2,378,933 | Klemm | June 26, 1945 |